Jan. 11, 1927.
H. C. MUMMERT
1,613,842
WING SKID
Filed August 26, 1925
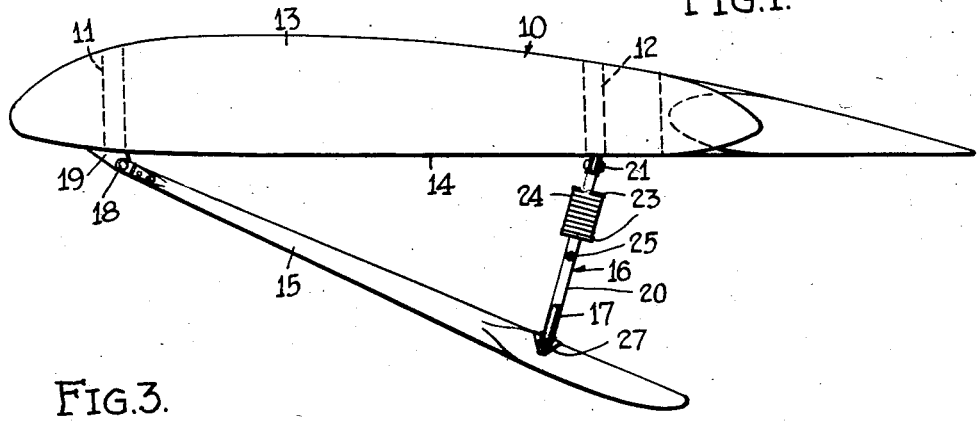
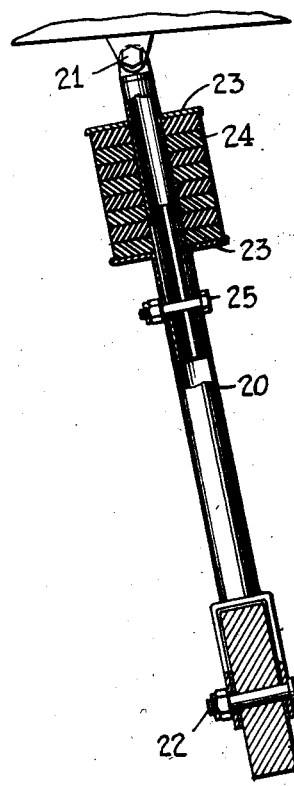
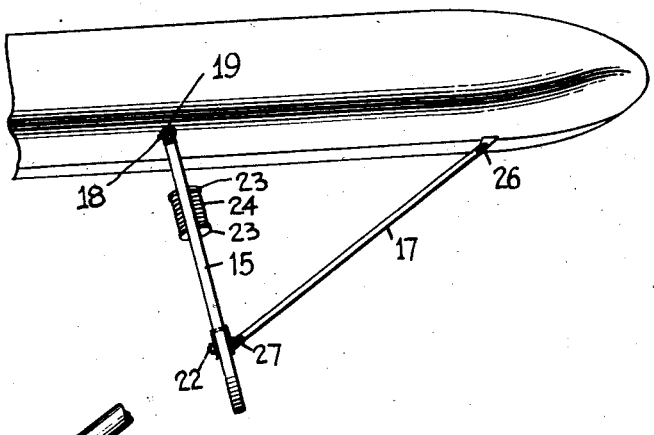
INVENTOR
HARVEY C. MUMMERT.
BY
ATTORNEY Patented Jan. 11, 1927.

1,613,842

UNITED STATES PATENT OFFICE.

HARVEY C. MUMMERT, OF HAMMONDSPORT, NEW YORK, ASSIGNOR TO AERIAL SERVICE CORPORATION, A CORPORATION OF NEW YORK.

WING SKID.

Application filed August 26, 1925. Serial No. 52,487.

My invention relates to wing skids for aeroplanes.

Wing skids for landplanes have been heretofore extensively used. Usually such wing skids are dependent entirely upon the inherent resiliency of the skid bar per se for the proper absorption of ground shocks. It is a not infrequent occurrence to break or damage such wing skids in landing upon rough or uneven field. Such wing skids do, however, under all operating conditions offer more or less protection to the aeroplane wing or wings.

In the present invention, instead of depending entirely upon the inherent resiliency of the skid bar for the complete absorption of ground shocks, a yielding connection is provided between the skid bar and the wing. Such connection preferably includes a superimposed tier of shock absorber discs arranged to encircle a telescopic rod or tube, the relatively movable sections of which are fastened respectively to the skid bar and to the wing, the skid bar at or near its forward end being pivotally fastened, and throughout the major portion of its length being inclined rearwardly and downwardly at an angle. Thus organized, the wing skid is increasingly yieldingly brought in contact with the ground during ground operation and its movement with respect to the wing yieldingly resisted not only by the inherent stiffness of the skid bar itself, but by the group of compressible shock absorber discs as well. In addition, means is provided to brace the wing skid against laterally directed shocks; the brace connection being such that the skid bar is properly guided when yieldingly displaced. Other characteristics of the invention will be hereinafter pointed out.

In the drawings, wherein like reference characters denote like or corresponding parts, Fig. 1 is a side elevation of the wing skid showing its relation to the aeroplane wing, Fig. 2 is a front elevation of the structure shown in Fig. 1, and Fig. 3 is a detail longitudinal sectional view of the yielding connection between the skid bar and the wing.

In the embodiment of the invention selected for illustration, an aeroplane wing designated in its entirety as 10 is shown. Preferably such wing includes a front wing beam 11, a rear wing beam 12, a plurality of ribs 13 (but one of which is shown), and an appropriate outer covering 14. Beneath the wing 10 and fastened to the beams 11 and 12 thereof is the wing skid. It (the wing skid) comprises a skid bar 15, a yielding connection 16 and a lateral brace 17, the skid bar 15 being inclined downwardly and rearwardly from the forward wing beam 11 to a point well below and behind the rear wing beam 12. At its forward end said bar 15 is pivotally fastened as at 18 to an appropriate fitting 19 in turn fastened to the front wing beam 11 and extended thru and beyond the outer covering 14 of the wing Being thus mounted the skid bar is adapted to yield upwardly against the action of the yielding connection 16.

In Fig. 3 of the drawings the detail construction of the yielding connection 16 is shown. Such connection preferably includes a telescopic rod or tube 20, the relatively movable sections of which are pivotally fastened respectively as at 21 and 22 to the rear wing beam 12 and to the skid bar 15 adjacent to its rear end. Said connection is slightly inclined forwardly from the pivot 21. Each section of the rod or tube 20 is provided with an abutment 23, said abutments being appropriately spaced and having disposed between them a superimposed tier of annular shock absorber discs 24. Said discs are preferably formed of rubber and are adapted to embrace the rod or tube 20 as shown. As a guide for the said rod or tube 20 one of the sections thereof is slotted whereas the mating section is provided with a fixed bolt 25 which passes transversely thru the slot.

Viewed from the front, the skid bar is not only inclined downwardly and rearwardly at an angle, but it is inclined slightly outwardly or toward the wing tip, whereby, when brought in contact with the ground the shock occasioned thru such contact is directly applied without incurring any tendency whatsoever to flex or bend the skid laterally. As a further means for preventing such lateral deflection, the brace 17 is provided. Such brace 17 is pivoted at its opposite ends as indicated at 26 and 27, the connection at 26 being in lateral alignment with the connection at 21.

A tail skid characterized as herein set forth is simple in the extreme; is exceptionally strong and sturdy; and when used, offers a minimum of resistance. Every portion of the skid is wholly accessible. Moreover, thru the relative arrangement illustrated, advantage is taken of the inherent resiliency of the skid bar itself for the proper absorption of ground shocks without detracting in any way from the shock absorbing characteristics of the wing skid obtained thru the use of the connection 16.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. The combination with an aeroplane wing, of a wing skid including a skid bar yieldingly supported beneath the aeroplane wing and normally inclined downwardly and rearwardly from the forward end of the skid bar, and a brace for the skid bar extended laterally upwardly at an angle, said brace being pivoted at its opposite end respectively to the aeroplane wing and to the skid bar to guide said bar in its yielding movement.

2. The combination with an aeroplane wing, of a wing skid including a normally downwardly and rearwardly inclined skid bar pivoted at its forward end close up under the aeroplane wing in the vicinity of its leading edge, said pivot axis being extended transversely of said skid bar whereby said skid bar may be vertically displaced under impact, a shock absorber connection between said wing and that portion of said skid bar in the vicinity of its rearward end, said shock absorber connection comprising telescoping members pivotally fastened to said skid bar and to said wing respectively, said pivot axes being extended respectively transversely of and longitudinally of said skid bar, a plurality of compression shock absorber discs incorporated in said shock absorber connection for resisting the telescopic movement of said members, and means for guiding the skid bar when it is displaced thru the compression of said shock absorber discs and for limiting its lateral movement about said longitudinally extending pivot axis.

3. The combination with an aeroplane wing, of a wing skid including a skid bar which, viewed from either the front or rear is normally inclined outwardly and downwardly from its upper end, and which, viewed from either side, is normally inclined rearwardly and downwardly from said upper end, a pivotal fastening for said skid bar at said upper end, means yieldingly resisting pivotal movement of said skid bar, and a lateral brace for said skid bar fastened respectively thereto and to said wing to limit the outward inclination of said skid bar without interfering in any way with its yielding pivotal movement under impact.

In testimony whereof I hereunto affix my signature.

HARVEY C. MUMMERT.